United States Patent
Liu et al.

(10) Patent No.: US 9,301,304 B2
(45) Date of Patent: Mar. 29, 2016

(54) DETERMINATION OF UE LOCATION IN A CELL

(75) Inventors: Honglai Liu, Beijing (CN); Leon He, Beijing (CN); Yanchao Niu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 14 days.

(21) Appl. No.: 14/352,300

(22) PCT Filed: Oct. 19, 2011

(86) PCT No.: PCT/CN2011/001740
§ 371 (c)(1),
(2), (4) Date: Apr. 16, 2014

(87) PCT Pub. No.: WO2013/056394
PCT Pub. Date: Apr. 25, 2013

(65) Prior Publication Data
US 2014/0287770 A1    Sep. 25, 2014

(51) Int. Cl.
*H04W 4/02* (2009.01)
*H04W 72/04* (2009.01)
*H04W 64/00* (2009.01)

(52) U.S. Cl.
CPC .......... *H04W 72/0453* (2013.01); *H04W 64/00* (2013.01); *H04W 64/006* (2013.01); *H04W 72/048* (2013.01)

(58) Field of Classification Search
CPC .......... H04W 28/0226; H04W 36/165; H04W 36/32; H04W 36/38; H04W 36/385; H04W 40/20; H04W 40/38; H04W 64/006; H04W 64/003

USPC .......... 455/404.2, 438, 349, 440, 441, 456.1
See application file for complete search history.

(56) References Cited

U.S. PATENT DOCUMENTS 8,989,752 B2 *  3/2015  Zhao .......................... 455/448
2005/0079876 A1  4/2005  Baskin
(Continued)

FOREIGN PATENT DOCUMENTS

| CN | 101742550 A |   | 6/2010 |
| CN | 102111775 A | * | 6/2011 |
| CN | 102148668 A |   | 8/2011 |

OTHER PUBLICATIONS

International Search Report for PCT Application No. PCT/CN2011/001740, mailed Aug. 2, 2012, 3 pages.
(Continued)

*Primary Examiner* — Christopher M Brandt
*Assistant Examiner* — Martin Chang
(74) *Attorney, Agent, or Firm* — Myers Bigel & Sibley, P.A.

(57) ABSTRACT

A radio base station and a method therein are provided for determining where in a cell a UE, being served by the radio base station, is located. The method includes receiving at least a first and subsequently a second Reference Signal Received Power (RSRP) value from the UE, and comparing the received first and second RSRP values. The method further includes selecting a first threshold value based on the comparison indicating increasing RSRP values corresponding to the UE moving towards a cell-center area, or selecting a second threshold value based on the comparison indicating decreasing RSRP values corresponding to the UE moving towards a cell-edge area. Further, the method includes determining whether the UE is located in the cell-center area or the cell-edge area using the selected threshold value.

20 Claims, 5 Drawing Sheets

(56) References Cited

U.S. PATENT DOCUMENTS

2011/0032908 A1    2/2011  Lindoff et al.
2011/0312281 A1*  12/2011  Xiao et al. ................ 455/67.11
2012/0188884 A1*   7/2012  Simonsson et al. .......... 370/252
2012/0244871 A1    9/2012  Zhao

OTHER PUBLICATIONS

Written Opinion of the International Searching Authority for PCT Application No. PCT/CN2011/001740, mailed Aug. 2, 2012, 4 pages.

ETSI TS 136.331 V10.1.0 (Apr. 2011); "LTE; Evolved Universal Terrestrial Radio Access (E-UTRA); Radio Resource Control (RRC); Protocol specification" (3GPP TS 36.331 version 10.1.0 Release 10); $3^{rd}$ Generation Partnership Project; 650 Route des Lucioles—Sophia Antipolis Valbonne—France; 292 pages.

Supplementary European Search Report, Application No. Ep 11 87 4332, Nov. 16, 2015.

ZTE CHTTL, "Two-threshold RSRP trigger mechanism", Agenda Item: 6.3, Document for: Discussion and Decision, R1-082379, 3GPP TSG RAN WG1 Meeting #53bis, Warsaw, Poland, Jun. 30-Jul. 4, 2008, 2 pp.

\* cited by examiner

DETERMINATION OF UE LOCATION IN A CELL

CROSS REFERENCE TO RELATED APPLICATION

This application is a 35 U.S.C. §371 national stage application of PCT International Application No. PCT/CN2011/001740, filed on 19 Oct. 2011, the disclosure and content of which is incorporated by reference herein in its entirety. The above-referenced PCT International Application was published in the English language as International Publication No. WO 2013/056394 A1 on 25 Apr. 2013.

TECHNICAL FIELD

The present disclosure relates to determination of the location of a user equipment in a cell and in particular to determining if a user equipment is located in a centre area or an edge area of a cell.

BACKGROUND

When designing and configuring any cellular or wireless communication network, several aspects have to be taken into account. The cellular communication networks of today are experiencing increasing amount of traffic, posing hard requirements on the cellular network.

One problem in cellular communication networks is interference between cells, also called inter-cell interference. Typically, one cell has a plurality of neighbouring cells. All these cells cause interference between each other.

One approach to reduce interference between cells is to let different cells make use of different frequencies compared to its immediate neighbours. However, such an approach requires a large spectrum of different frequencies. A cellular communication network typically has a relatively limited frequency band to use, hence this approach may not be possible to implement.

Another approach to reduce or eliminate inter-cell interference is to make use of Inter-Cell Interference Coordination, ICIC. ICIC is introduced into the Long Term Evolution, LTE, protocol to improve cell edge performance. ICIC divides the frequency resources in a cell into several parts, typically between a cell edge area and a cell centre area. Neighbouring cells are then not allowed to use the same frequencies at their respective cell edge area.

In order to employ ICIC, the radio base station of the cell must be able to determine where in the cell the UEs are located in order to schedule appropriate frequency resources to the different UEs.

One approach to determine the location of a UE in a cell is the distance method. In this approach, the cell is approximated to a circle having a radius R. Then the boundary between the cell centre and the cell edge is defined as a factor of the radius. Typically, the boundary is about (0.7-0.8)R such that the cell centre area is from 0*R up to say 0.75*R and the cell edge area is from 0.75*R up to R.

This approach is associated with different problems. The distance from the cell centre to the UE is difficult to determine. The distance can be estimated using e.g. a path-loss shadow fading model but such a model is influenced by many factors and cannot estimate distances without substantial computation complexity. Another way to estimate the distance is using Global Positioning System, GPS. However, this way lacks compatibility with UEs not being equipped with GPS. Further the accuracy of GPS may vary depending on the environment and may not always be accurate enough in urban environments.

Another approach to determine the location of a UE in a cell is the Single Reference Signal Received Power, RSRP, method. In this approach, the radio base station uses the RSRP values reported from the UE to determine the location of the UE. One threshold is defined such that the location of the UE is determined by the reported RSRP value being above or below the defined threshold.

Also this approach is associated with some problems. One problem is if the UE is moving around in the cell such that the reported RSRP values from the UE are close to the RSRP threshold value. This might lead to oscillating handovers between cell edge are and cell centre area. Single RSRP values may also vary due to the environment and may therefore not be reliable.

SUMMARY

It is an object to address at least some of the problems outlined above. In particular, it is an object to provide a radio base station and a method therein for determining where in a cell a UE, being served by the radio base station, is located, wherein different threshold values are selected for determining the location of the UE, the threshold being selected depending on whether the UE is moving towards the cell centre area or the cell edge area. These objects and others may be obtained by providing a radio base station and a method in a radio base station according to the independent claims attached below.

According to an aspect a method in a radio base station for determining where in a cell a UE, being served by the radio base station, is located is provided. The method comprises receiving at least a first and subsequently a second Reference Signal Received Power, RSRP, value from the UE; and comparing the received first and second RSRP values. The method further comprises selecting a first threshold value if the comparison indicates increasing RSRP values corresponding to the UE moving towards a cell-centre area, or selecting a second threshold value if the comparison indicates decreasing RSRP values corresponding to the UE moving towards a cell-edge area. Further, the method comprises determining whether the UE is located in the cell-centre area or the cell-edge area using the selected threshold value.

According to an aspect, a radio base station in a communication network, the radio base station being configured to determine where in a cell a user equipment, UE, being served by the radio base station is located, wherein the radio base station has a coverage area defining the cell is provided. The radio base station comprises a communication module adapted to receive at least a first and subsequently a second RSRP value from the UE. The radio base station further comprises a comparing module adapted to compare the received first and second RSRP values. Still further, the radio base station comprises a selecting module adapted to select a first threshold value if the comparison indicates increasing RSRP values corresponding to the UE moving towards a cell-centre area, or to select a second threshold value if the comparison indicates decreasing RSRP values corresponding to the UE moving towards a cell-edge area. The radio base station also comprises a determining module adapted to determine whether the UE is located in the cell-centre area or the cell-edge area using the selected threshold value.

The radio base station and the method therein have several advantages. One advantage is that the double thresholds more accurately determine the location of the UE within the cell.

Another advantage is that complexity among cell configuration may be decreased because of the more accurate determination of the location of the UE within the cell. A further advantage is that the double relative thresholds build up a relationship with neighbouring radio base stations.

BRIEF DESCRIPTION OF DRAWINGS

Embodiments will now be described in more detail in relation to the accompanying drawings, in which.

DETAILED DESCRIPTION

Briefly described, a radio base station and a method therein for determining where in a cell a user equipment, UE, being served by the radio base station is located are provided. The radio base station may be employed in a wireless communication system and the radio base station has a coverage area defining the cell. The cell is virtually divided into a cell centre area and a cell edge area.

Figure 1A:
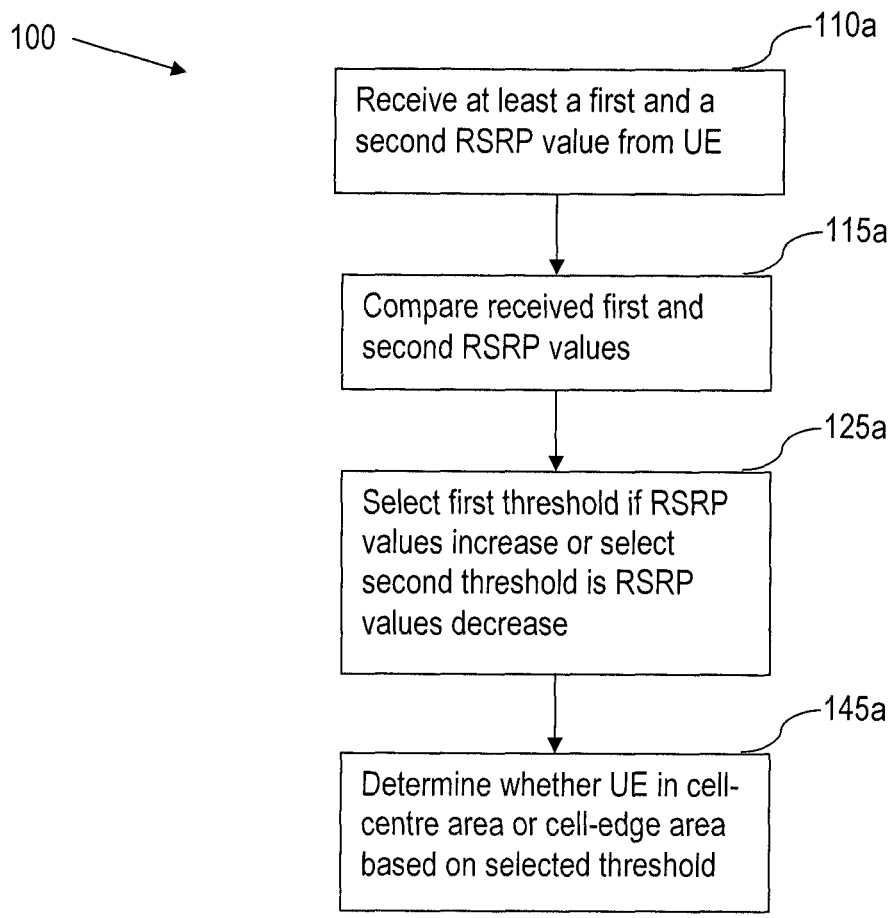
FIG. 1a is a flowchart of an embodiment of a method for determining a location of a UE.

Such an exemplifying method will now be described with reference to FIG. 1a. FIG. 1a is a flowchart of an embodiment of a method for determining a location of a UE within a cell of a radio base station.

FIG. 1a illustrates the method 100 in a radio base station for determining where in the cell the UE, being served by the radio base station, is located, the method comprising receiving 110a at least a first and subsequently a second Reference Signal Received Power, RSRP, value from the UE; and comparing 115a the received first and second RSRP values. The method further comprises selecting 125a a first threshold value if the comparison indicates increasing RSRP values corresponding to the UE moving towards a cell-centre area, or selecting a second threshold value if the comparison indicates decreasing RSRP values corresponding to the UE moving towards a cell-edge area. Further, the method comprises determining 145a whether the UE is located in the cell-centre area or the cell-edge area using the selected threshold value.

In this example, the radio base station receives 110a a first RSRP value from the UE at one point in time. Thereafter, the he radio base station receives a second RSRP value from the UE at a later point in time as the received first RSRP value. During the time between the UE reporting the first RSRP value and reporting the second RSRP value, the UE may have moved within the cell. In this example, the UE is presumed to both be moving within the cell and either towards the centre of the cell or towards the edge of the cell. This will be more discussed later.

Figure 1B:
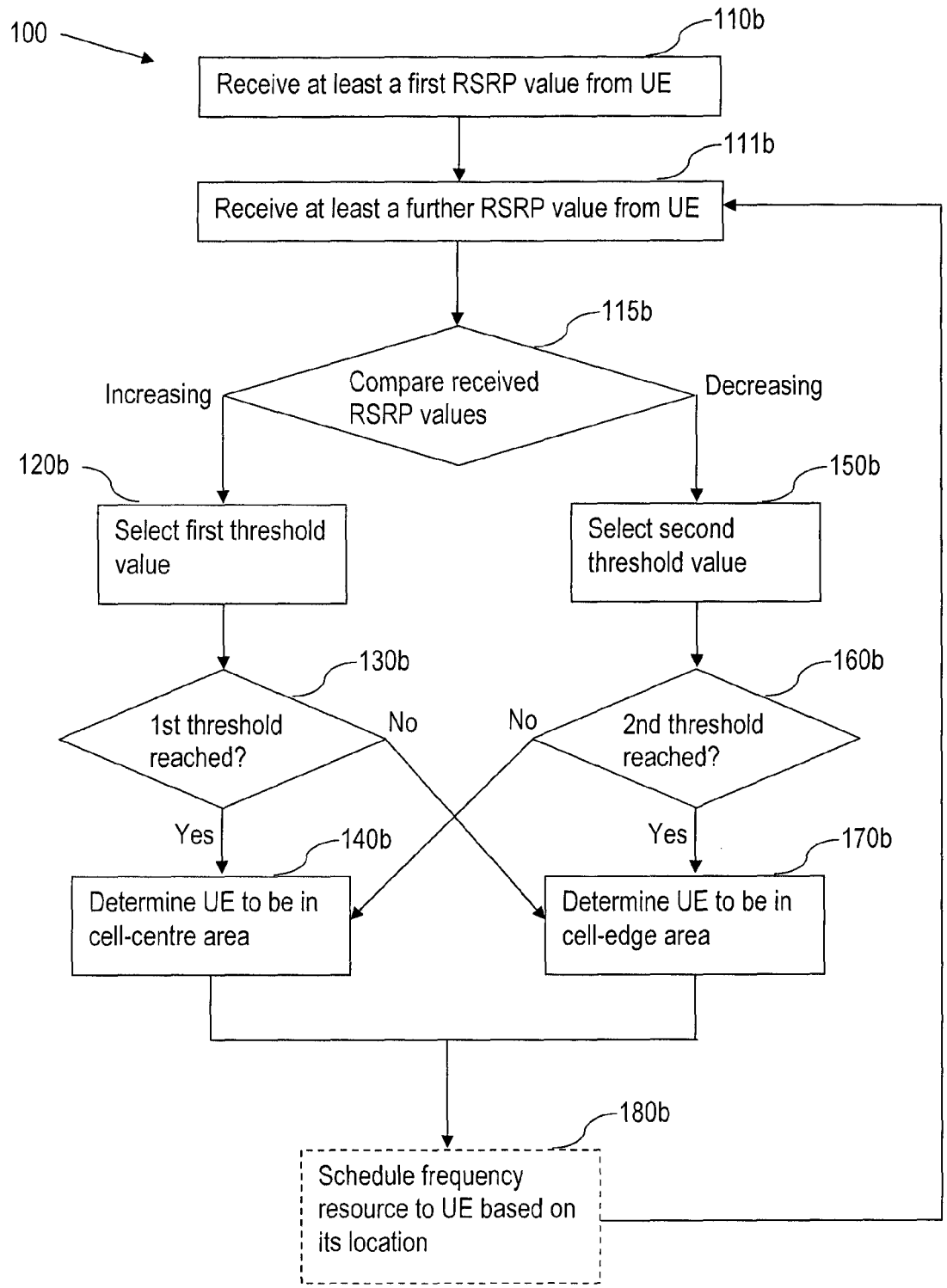
FIG. 1b is a flowchart of an embodiment of a method for determining a location of a UE.

FIG. 1b is also a flowchart of en exemplifying method according to an embodiment.

FIGS. 1a and 1b illustrate that after the second RSRP value has been received 111b by the radio base station, the method comprises the radio base station comparing 115a, 115b the first and the second RSRP value. If the second RSRP value is larger than the first RSRP value, the UE is determined to be moving towards the centre of the cell as the RSRP values are increasing. Since the RSRP value is a measure of received signal power by the UE, it is assumed that the larger the value, the closer the UE is to the cell centre. In the case that the RSRP values are determined to be increasing, the radio base station selects 120b a first threshold value and then compares 130b the last received RSRP value, i.e. the second received RSRP value, to the first threshold. If the first threshold is reached or even exceeded, the radio base station determines 140b that the UE is located in the cell centre area of the cell.

On the other hand, if the second RSRP value is smaller than the first RSRP value, the UE is determined to be moving towards the edge of the cell as the RSRP values are decreasing. In the case that the RSRP values are determined to be decreasing, the radio base station selects 150b a second threshold value and then compares 160b the last received RSRP value, i.e. the second received RSRP value, to the second threshold. If the second threshold is reached or even exceeded, the radio base station determines 170b that the UE is located in the cell edge area of the cell.

The exemplifying method in a radio base station disclosed above has several advantages. One advantage is that the double thresholds more accurately determine the location of the UE within the cell. Another advantage is that complexity among cell configuration may be decreased because of the more accurate determination of the location of the UE within the cell.

According to an embodiment, the frequency resources available for the UE in the cell are divided between the cell-centre area and the cell-edge area such that the allocation of a frequency resource to the UE is dependent on whether the UE is located in the cell-centre area or in the cell-edge area.

The radio base station typically has certain frequency resources available to be scheduled to the different UEs being served by the radio base station. In order to decrease interference with other neighbouring cells, the radio base station divides the available frequency resources between the two cell areas such that a first part of the available frequency resources are scheduled to UEs located in the cell centre area and a second part of the available frequency resources are scheduled to UEs located in the cell edge area. By coordinating the frequency resources intended for the cell centre area and the cell edge area between neighbouring cells, interference between neighbouring cells can be reduced.

According to yet an embodiment, the first and second threshold values are configured by an Operation, Administration and Maintenance, OAM, node in the communication network.

The operator of the communication network, or network provider, typically designs or configures the communication network on cell level by setting a plurality of different parameters and thresholds. The different parameters are then forwarded to respective nodes within the communication network. The design or configuration of the threshold values is in this example comprised in an OAM node in the communication network. By configuring the threshold values in the OAM node, the network provider can easily adjust or change the values of the thresholds centrally, by performing the adjustment or change in the OAM node instead of having to locally adjust or change the values of the thresholds in each radio base station.

According to still an embodiment, the first and second threshold values are configured by a network provider according to requirements of different scenarios.

The scenario or radio conditions may vary over time, the number of user equipment in the cell may vary, the amount of traffic over the air interface may vary and interference from neighbouring cells may also vary. Due to this variation, the values of the first and second threshold can be configured by a network provider so that the values of the thresholds are chosen to meet different requirements set forth by the different scenarios.

According to another embodiment, the method comprises the radio base station determining a factor, f, which is the ratio between a received RSRP value of the serving radio base station and a sum of RSRP values of neighbouring radio base stations for the UE, wherein the method further comprises comparing the factor f with the first and second threshold values in order to determine the location of the UE in the cell.

Figure 2:
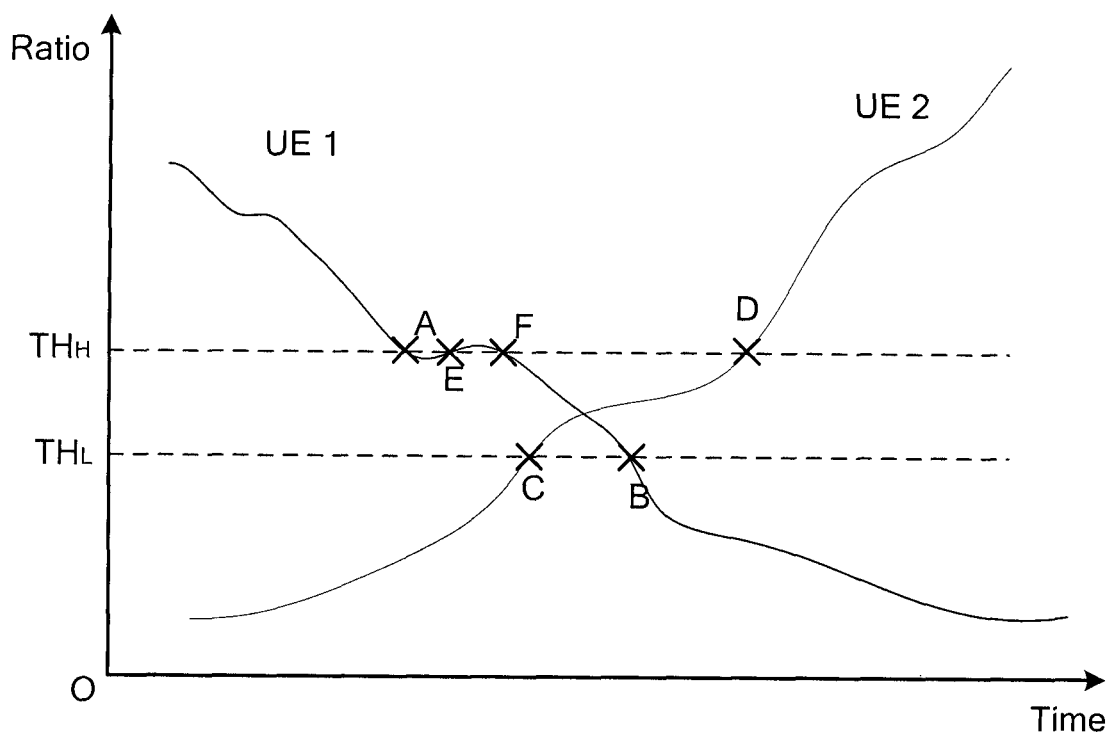
FIG. 2 is a graph schematically illustrating a ratio between RSRP values for a serving radio base station and RSRP values for neighbouring radio base stations over time for two UEs moving about in the cell.

Turning to FIG. 2, which is a graph schematically illustrating a ratio between RSRP values for a serving radio base station and RSRP values for neighbouring radio base stations over time for two UEs moving about in a cell of a serving radio base station.

FIG. 2 illustrates two UEs moving about in the cell, UE1 and UE2. UE1 reports decreasing RSRP values or decreasing ratio between RSRP values for the serving radio base station and RSRP values for neighbouring radio base stations. This implies that UE1 is moving towards the cell edge area over time. UE2 reports increasing RSRP values or increasing ratio between RSRP values for the serving radio base station and RSRP values for neighbouring radio base stations. This implies that UE2 is moving towards the cell centre area over time.

FIG. 2 further illustrates two thresholds having a respective threshold value, $TH_H$ and $TH_L$. The two threshold values are for example determined by the RSRP reports from UEs of the serving radio base station with respect to the RSRP values of the serving radio base station and with respect to RSRP values of neighbouring radio base stations.

The RSRP values are reported from the UEs to the radio base station periodically or un-periodically depending on higher layer configuration.

The radio base station determining a factor, f, which is the ratio between a received RSRP value of the serving radio base station and a sum of RSRP values of neighbouring radio base stations for the UE. For a UE number i, that is $UE_i$, the corresponding factor, $f_i$ can be expressed as:

$$f_i = \frac{RSRP_i}{\sum_{j \neq i} RSRP_j} \quad (1)$$

In equation (1) above, RSRP stands for the RSRP value received from $UE_i$ within the cell, i.e. the serving cell. $RSRP_j$ stands for the RSRP values received from neighbouring radio base stations. UE number i, that is $UE_i$, reports to the serving radio base station, both the RSRP value for the serving cell or radio base station, that is $RSRP_i$ and also the RSRP values for the neighbouring cells or neighbouring radio base stations.

Once the factor $f_i$ for $UE_i$ has been determined, the radio base station compares the factor $f_i$ with the first and second threshold values in order to determine the location of the $UE_i$ in the cell. In FIG. 2, the first and second threshold values are the $TH_H$ and $TH_L$.

According to another embodiment, the method comprises the radio base station determining a factor, f, which is the ratio between a received RSRP value of the serving radio base station and a maximum RSRP value of neighbouring radio base stations for the UE, wherein the method further comprises comparing the factor f with the first and second threshold values in order to determine the location of the UE in the cell.

This embodiment is similar to the above described embodiment, the difference is how to determine the factor $f_i$ for $UE_i$. Instead of determining the ratio between a received RSRP value of the serving radio base station and a sum of RSRP values of neighbouring radio base stations for the UE, the ratio between the received RSRP value of the serving radio base station and a maximum RSRP value of neighbouring radio base stations for the UE is determined. This can be expressed as:

$$f_i = \frac{RSRP_i}{\mathrm{argmax}\{RSRP_j,\ j \neq i\}} \quad (2)$$

In equation (2) above, $RSRP_i$ stands for the RSRP value of the serving radio base station received by $UE_i$ within the cell, i.e. the serving radio base station. $RSRP_j$ stands for the RSRP values received, by the $UE_i$, from neighbouring radio base stations.

Again with reference to FIG. 2, UE1 is moving towards the cell edge area over time. The UE1 sends measurement reports comprising RSRP values to the radio base station. In FIG. 2, UE1 is firstly located in the cell centre area wherein the ratio or factor f is relatively high. Starting to the left in the figure, before point A in time, the UE1 travels towards the cell edge and the received RSRP values are decreasing over time. Comparing with the flowchart in FIGS. 1a and 1b, the received RSRP values are decreasing which results in the radio base station selecting the second threshold, which in FIG. 2 is the $TH_L$. The radio base station compares the last received RSRP value, or corresponding ratio/factor, to the threshold value $TH_L$. Since the threshold value is not reached or exceeded, UE1 is determined to be located in the cell centre area.

FIG. 2 illustrates some points in time, A, E and F when the ratio or factor f is close to the first threshold, $TH_H$. This is of no consequence for the determination of the location of the UE, since this is not the threshold which the radio base station has selected. At a later point in time, B, the ratio or factor f reaches the second threshold and then the radio base station determines that UE1 is located in the cell edge area. However, in an example, the method comprises the radio base station storing information within the radio base station that the non-selected threshold, i.e. the first threshold, has been reached at point A in time. This will be explained in more detailed below.

FIG. 2 also illustrates UE2 moving towards the cell centre area over time. The UE2 sends measurement reports comprising RSRP values to the radio base station. In FIG. 2, UE2 is firstly located in the cell edge area wherein the ratio or factor f is relatively low. Starting to the left in the figure, before point C in time, the UE2 travels towards the cell edge and the received RSRP values are increasing over time. Comparing with the flowchart in FIGS. 1a and 1b, the received RSRP values are increasing which results in the radio base station selecting the first threshold, which in FIG. 2 is the $TH_H$. The radio base station compares the last received RSRP value, or corresponding ratio/factor, to the threshold value $TH_H$. Since the threshold value is not reached or exceeded, UE2 is determined to be located in the cell edge area.

FIG. 2 illustrates a point in time C when the ratio or factor f is close to the second threshold, $TH_L$. This is of no consequence for the determination of the location of the UE, since this is not the threshold which the radio base station has selected. At a later point in time, D, the ratio or factor f reaches the first threshold $TH_H$ and then the radio base station determines that UE2 is located in the cell centre area. However, in an example, the method comprises the radio base station storing information within the radio base station that the non-selected threshold, i.e. the second threshold, has been reached at point C in time. This will be explained in more detailed below.

It shall be noted that be the expression that a threshold has been exceeded is meant that the threshold has been crossed or passed. In other words, with reference to FIG. 2, for UE1, when the ratio or factor has exceeded threshold $TH_H$, then the ratio or factor is lower than threshold $TH_H$. Likewise for UE2, when the ratio or factor has exceeded threshold $TH_L$, then the ratio or factor is higher than threshold $TH_L$.

Reverting to FIG. 1, according to another embodiment, the method comprises allocating 180a a frequency resource to the UE based on the location of the UE.

As was described above, the frequency resources of the cell are divided between the cell centre are and the cell edge area. As a consequence, the radio base station allocates or schedules different radio resources to UEs in the cell centre area as compared to those UEs in the cell edge area. This is illustrated in FIG. 1b by scheduling or allocating a frequency resource to the UE in step 180b which takes place after the radio base station has determined that the UE is located either in the cell centre area in step 140a or that the UE is located in the cell edge area in step 170a.

Figure 3:
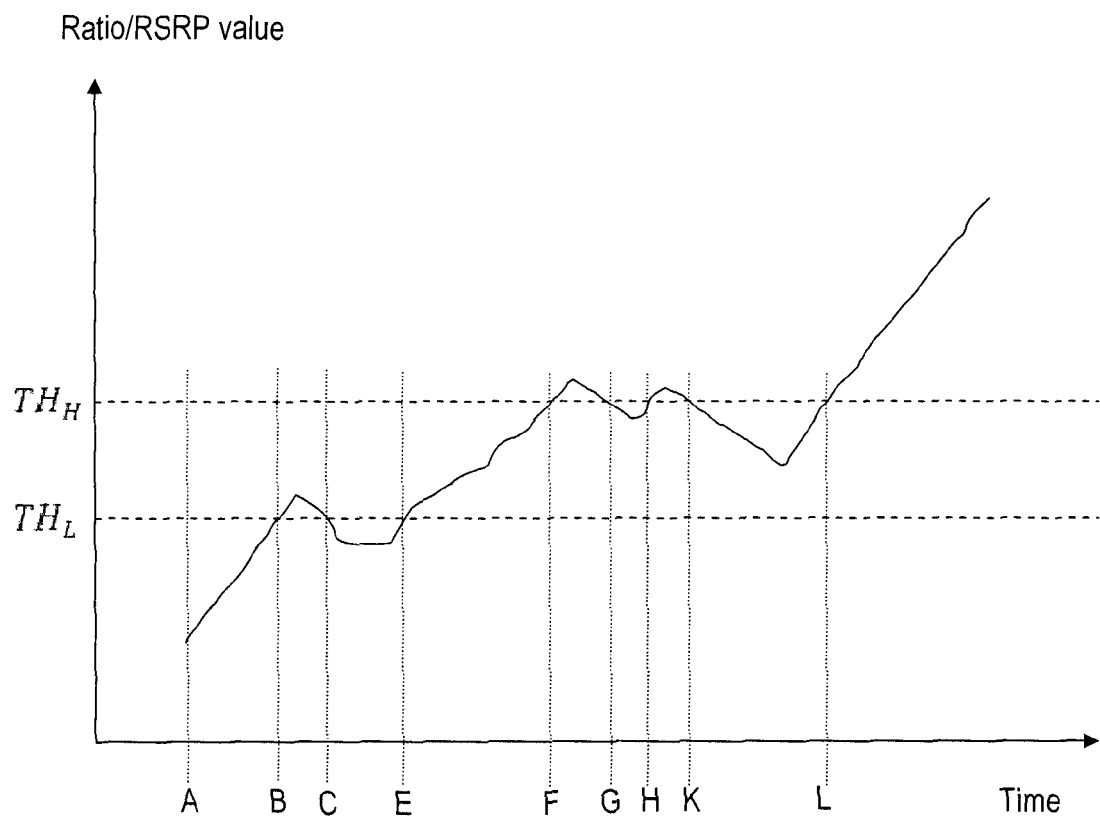
FIG. 3 is a graph schematically illustrating a ratio between RSRP values for a serving radio base station and RSRP values for neighbouring radio base stations over time for one UE moving about in the cell.

FIG. 3 is a graph schematically illustrating a ratio between RSRP values for a serving cell and RSRP values for neighbouring cells over time for one UE moving about in the cell.

In FIG. 3, the UE starts at a point in time, A, wherein the UE reports a first received RSRP values. Thereafter, the UE reports at least a second RSRP value before point B in time. The radio base station receives the reported RSRP values and they indicate that the RSRP values are increasing resulting in that the radio base station selects the first threshold value, $TH_H$. It shall be noted that depending on the time elapsed between point A and B in time, the UE may have reported a plurality if RSRP values. Comparing with the flowchart of FIGS. 1a and 1b, the RSRP values are increasing, the first threshold is selected in step 120b and before point B in time, the received RSRP values have not reached the threshold value. As a consequence, the radio base determines that the UE is located in the cell edge area in step 170. Correspondingly, frequency resources are scheduled or allocated to the UE accordingly.

Reverting to FIG. 3, at point B in time, the radio base station receives an RSRP value that is equal to the second threshold, or the ratio/factor described above reaches the second threshold. However, this is of no consequence for the determination of the location of the UE as the radio base station has selected the first threshold, i.e. $TH_H$ to compare either the RSRP values against or the above described ratio or factor f. Therefore, the UE is determined to still be located in the cell edge area. However, in an example, the method comprises the radio base station storing information within the radio base station that the non-selected first threshold has been reached at point B in time, for the first time.

FIG. 3 illustrates the RSRP values, or the ratio/factor, fluctuating such that they are sometimes increasing and sometimes decreasing, however they have still not reached the first threshold value before point F in time, and the UE will be determined to be located in the cell edge area. Between point B and point C in time, the RSRP values starts decreasing and at point C in time, the second threshold is crossed again. In this example, the radio base station has stored information that the first threshold, $TH_H$, has been reached before this point in time. When determining the location of the UE, the radio base station deduces from the previously received RSRP values in conjunction with information that the first threshold, $TH_H$, has been reached before this point in time that the UE may still be moving towards the cell centre area and the second threshold, $TH_L$, has not yet been reached so the UE is still located in the cell edge area.

At point F in time, the radio base station receives an RSRP value that is equal to the first threshold $TH_H$, or the ratio/factor described above reaches the first threshold. This results in the radio base station determining that the UE is located in the cell centre area in step 140 in FIG. 1. Then the radio base station schedules or allocates frequency resources accordingly, i.e. based on the location of the UE, in step 180b in FIG. 1b.

After point F in time, the received RSRP values, or the ratio/factor, start decreasing again. Looking at FIG. 1b, the radio base station will select the second threshold value $TH_L$. The radio base station will compare the last received RSRP value or the ratio/factor with the second threshold and determine that the second threshold has not been reached, whereby the radio base station determines that the UE is still located in the cell centre area. The received RSRP values or the ratio/factor will even drop below the first threshold, but since the radio base station has selected the second threshold to compare the last received RSRP value or the ratio to compare to, this is of no consequence.

From FIG. 3 it can clearly be seen that by having two separate thresholds to be used for determining where in the cell the UE is located, frequent and unnecessary "handover" between the cell centre area and the cell edge area is avoided. In case only one threshold were used, a UE moving about in a manner such that the RSRP values would fluctuate around that one and only threshold would cause the radio base station to frequently "hand over" the UE between the cell edge area and the cell centre area. For clarity reasons it is pointed out that it is not a handover between cells, but since the frequency resources are divided between the cell edge area and the cell centre area, the radio base station would frequently have to schedule different frequency resources to the UE.

Embodiments herein also relates to a radio base station in a communication network configured to determine where in a cell a UE being served by the radio base station is located, wherein the radio base station has a coverage area defining the cell. Such a radio base station will now be described with reference to FIG. 4. The radio base station has the same objects and advantages as the method therein which has been described above. The radio base station will only be described in brief in order to avoid unnecessary repetition.

Figure 4:
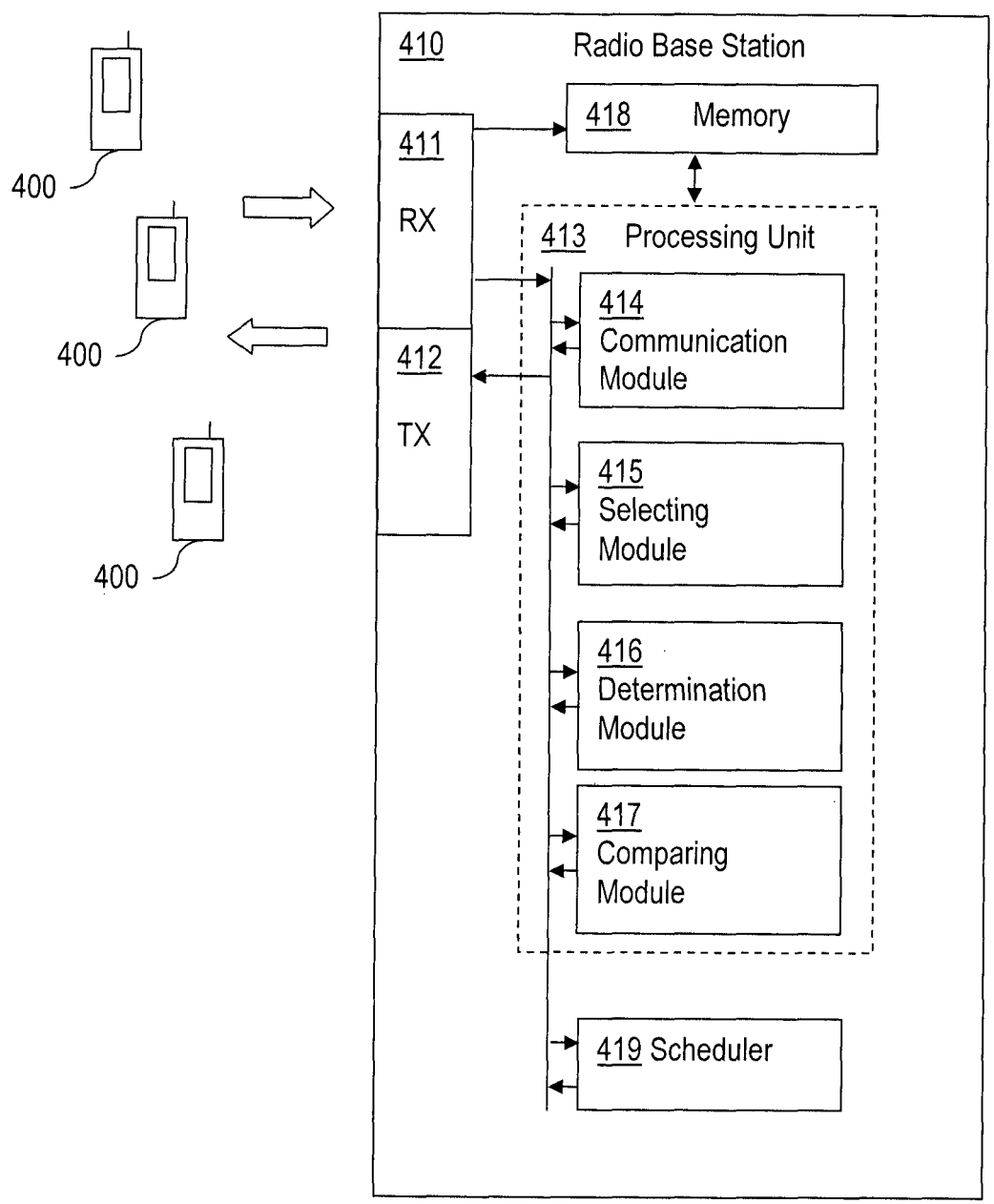
FIG. 4 is a block diagram schematically illustrating an embodiment of a radio base station adapted to determine a location of a UE.

FIG. 4 illustrates an exemplifying embodiment of a radio base station for use in a communication network configured to determine where in a cell a UE being served by the radio base station is located, the radio base station comprising a communication module 414 adapted to receive at least a first and subsequently a second RSRP value from the UE. The radio base station further comprises a comparing module 417 adapted to compare the received first and second RSRP values. Still further, the radio base station comprises a selecting module 415 adapted to select a first threshold value if the comparison indicates increasing RSRP values corresponding to the UE 400 moving towards a cell-centre area, or to select a second threshold value if the comparison indicates decreasing RSRP values corresponding to the UE 400 moving towards a cell-edge area. The radio base station also comprises a determining module 416 adapted to determine whether the UE 400 is located in the cell-centre area or the cell-edge area using the selected threshold value.

FIG. 4 illustrates the radio base station comprising a receiver arrangement 411 and a transmitting arrangement 412 for communicating with UEs 400 currently being served by the radio base station 410. The radio base station further comprises a memory 418 and a processing unit 413. The processing unit in FIG. 4 is illustrated comprising a plurality of modules adapted to perform the different tasks as described above. Further, the radio base station 410 comprises a scheduler 419 adapted to schedule or allocate frequency resources to the UEs 400. In an example, the memory 418 is used to store previously received RSRP values, or the above described factor, f, or ratio. The memory is also used for storing information whether the received RSRP values or the factor/ratio has reached the non-selected threshold value as described above in conjunction with FIG. 3.

According to an embodiment, frequency resources available for the UE in the cell are divided between the cell-centre area and the cell-edge area such that the allocation of a frequency resource to the UE 400 is dependent on whether the UE is located in the cell-centre area or in the cell-edge area.

According to still an embodiment, the first and second threshold values are configured by an Operation and Maintenance node in the communication network.

According to yet an embodiment, the first and second threshold values are configured by a network provider according to requirements of different scenarios.

In an example, the determining module 416 is adapted to determine a factor, f, which is the ratio between a received RSRP value of the serving radio base station and a sum of RSRP values of neighbouring radio base stations for the UE 400, wherein the determining module 416 further is adapted to compare the factor f with the first and second threshold values in order to determine the location of the UE 400 in the cell.

In still an example, the determining module 416 is adapted to determine a factor, f, which is the ratio between a received RSRP value of the serving radio base station and a maximum RSRP value of neighbouring radio base stations for the UE 400, wherein the determining module 416 further is adapted to compare the factor f with the first and second threshold values in order to determine the location of the UE 400 in the cell.

According to an embodiment, the radio base station further comprises a scheduler 419 adapted to allocate a frequency resource to the UE.

It should be noted that FIG. 4 merely illustrates various functional units and modules in the radio base station in a logical sense. The functions in practice may be implemented using any suitable software and hardware means/circuits etc. Thus, the embodiments are generally not limited to the shown structures of the radio base station and the functional units and modules. Hence, the previously described exemplary embodiments may be realised in many ways. For example, one embodiment includes a computer-readable medium having instructions stored thereon that are executable by the processing unit 413 for performing the method. The instructions executable by the computing system and stored on the computer-readable medium perform the method steps of the present invention as set forth in the claims.

FIG. 4 schematically shows an embodiment of a radio base station 410 in a cellular communication network. Comprised in the radio base station 410 are here a processing unit 413, e.g. with a DSP (Digital Signal Processor). The processing unit 413 may be a single unit or a plurality of units to perform different actions of procedures described herein. The radio base station 210 may also comprise an input unit for receiving signals from other entities, and an output unit for providing signal(s) to other entities. The input unit and the output unit may be arranged as an integrated entity.

Furthermore, the radio base station 410 comprises at least one computer program product in the form of a non-volatile memory, e.g. an EEPROM (Electrically Erasable Programmable Read-Only Memory), a flash memory and a hard drive. The computer program product comprises a computer program, which comprises code means, which when executed in the processing unit 413 in the radio base station 410 causes the radio base station to perform the actions e.g. of the procedure described earlier in conjunction with FIG. 1.

The computer program may be configured as a computer program code structured in computer program modules. Hence, in an exemplifying embodiment, the code means in the computer program of the radio base station 410 comprises a communication module for receiving at least a first and subsequently a second Reference Signal Received Power, RSRP, value from the UE. The computer program further comprises a comparing module for comparing (115) the received first and second RSRP values. The computer program further comprises a selecting module for selecting a first threshold value if the comparison indicates increasing RSRP values corresponding to the UE moving towards a cell-centre area, or selecting a second threshold value if the comparison indicates decreasing RSRP values corresponding to the UE moving towards a cell-edge area. Further, the computer program further comprises a determining module for determining whether the UE is located in the cell-centre area or the cell-edge area using said selected threshold value. Still further, the computer program could further comprise a prediction module for predicting a load based on the updated table. The computer program could further comprise other modules for providing other desired functionality.

The modules could essentially perform the actions of the flow illustrated in FIG. 1, to emulate the radio base station 410. In other words, when the different modules are executed in the processing unit 413, they may correspond to the modules 414-417 of FIG. 4.

Although the code means in the embodiment disclosed above in conjunction with FIG. 4 are implemented as computer program modules which when executed in the processing unit causes the radio base station 410 to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the radio base station.

It is to be understood that the choice of interacting units or modules, as well as the naming of the units within this disclosure are only for exemplifying purpose, and nodes suitable to execute any of the methods described above may be configured in a plurality of alternative ways in order to be able to execute the suggested procedure actions.

It should also be noted that the units or modules described in this disclosure are to be regarded as logical entities and not with necessity as separate physical entities While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method in a radio base station in a communication network for determining where in a cell a user equipment, UE, being served by the radio base station is located, wherein the radio base station has a coverage area defining the cell, the method comprising:
   receiving at least a first and subsequently a second Reference Signal Received Power, RSRP, value from the UE,
   comparing the received first and second RSRP values,
   selecting a first threshold value based on the comparison indicating increasing RSRP values corresponding to the UE moving towards a cell-centre area, or selecting a second threshold value based on the comparison indicating decreasing RSRP values corresponding to the UE moving towards a cell-edge area,
   determining a factor, f, which is the ratio between a received RSRP value of the radio base station and a sum of RSRP values of neighbouring radio base stations for the UE, and
   comparing the factor f with said first and second threshold values in order to determine the location of the UE in the cell.

2. A method according to claim 1, wherein frequency resources available for the UE in the cell are divided between the cell-centre area and the cell-edge area such that the allocation of a frequency resource to the UE is dependent on whether the UE is located in the cell-centre area or in the cell-edge area.

3. A method according to claim 1, wherein said first and second threshold values are configured by an Operation, Administration and Maintenance, OAM, node in the communication network.

4. A method according to claim 1, wherein said first and second threshold values are configured by a network provider according to requirements of different scenarios.

5. A method according to claim 1, further comprising allocating a frequency resource to the UE based on the location of the UE.

6. A method in a radio base station in a communication network for determining where in a cell a user equipment, UE, being served by the radio base station is located, wherein the radio base station has a coverage area defining the cell, the method comprising:
   receiving at least a first and subsequently a second Reference Signal Received Power, RSRP, value from the UE,
   comparing the received first and second RSRP values,
   selecting a first threshold value based on the comparison indicating increasing RSRP values corresponding to the UE moving towards a cell-centre area, or selecting a second threshold value based on the comparison indicating decreasing RSRP values corresponding to the UE moving towards a cell-edge area,
   determining a factor, f, which is the ratio between a received RSRP value of the radio base station and a maximum RSRP value of neighbouring radio base stations for the UE, and
   comparing the factor f with said first and second threshold values in order to determine the location of the UE in the cell.

7. A method according to claim 6, wherein frequency resources available for the UE in the cell are divided between the cell-centre area and the cell-edge area such that the allocation of a frequency resource to the UE is dependent on whether the UE is located in the cell-centre area or in the cell-edge area.

8. A method according to claim 6, wherein said first and second threshold values are configured by an Operation, Administration and Maintenance, OAM, node in the communication network.

9. A method according to claim 6, wherein said first and second threshold values are configured by a network provider according to requirements of different scenarios.

10. A method according to claim 6, further comprising allocating a frequency resource to the UE based on the location of the UE.

11. A radio base station in a communication network configured to determine where in a cell a user equipment, UE, being served by the radio base station is located, wherein the radio base station has a coverage area defining the cell, the radio base station comprising:
   a communication module adapted to receive at least a first and subsequently a second Reference Signal Received Power, RSRP, value from the UE,
   a comparing module adapted to compare the received first and second RSRP values,
   a selecting module adapted to select a first threshold value based on the comparison indicating increasing RSRP values corresponding to the UE moving towards a cell-centre area, or to select a second threshold value based on the comparison indicating decreasing RSRP values corresponding to the UE moving towards a cell-edge area,
   a determining module adapted to determine a factor, f, which is the ratio between a received RSRP value of the radio base station and a sum of RSRP values of neighbouring radio base stations for the UE, and compare the factor f with said first and second threshold values in order to determine the location of the UE in the cell.

12. A radio base station according to claim 11, wherein frequency resources available for the UE in the cell are divided between the cell-centre area and the cell-edge area such that the allocation of a frequency resource to the UE is dependent on whether the UE is located in the cell-centre area or in the cell-edge area.

13. A radio base station according to claim 11, wherein said first and second threshold values are configured by an Operation, Administration and Maintenance, OAM, node in the communication network.

14. A radio base station according to claim 11, wherein said first and second threshold values are configured by a network provider according to requirements of different scenarios.

15. A radio base station according to claim 11, further comprising a scheduler adapted to allocate a frequency resource to the UE based on the location of the UE.

16. A radio base station in a communication network configured to determine where in a cell a user equipment, UE, being served by the radio base station is located, wherein the radio base station has a coverage area defining the cell, the radio base station comprising:

a communication module adapted to receive at least a first and subsequently a second Reference Signal Received Power, RSRP, value from the UE, a comparing module adapted to compare the received first and second RSRP values, a selecting module adapted to select a first threshold value based on the comparison indicating increasing RSRP values corresponding to the UE moving towards a cell-centre area, or to select a second threshold value based on the comparison indicating decreasing RSRP values corresponding to the UE moving towards a cell-edge area, a determining module adapted to determine a factor, f, which is the ratio between a received RSRP value of the radio base station and a maximum RSRP value of neighbouring radio base stations for the UE, and compare the factor f with said first and second threshold values in order to determine the location of the UE in the cell.

17. A radio base station according to claim 16, wherein frequency resources available for the UE in the cell are divided between the cell-centre area and the cell-edge area such that the allocation of a frequency resource to the UE is dependent on whether the UE is located in the cell-centre area or in the cell-edge area.

18. A radio base station according to claim 16, wherein said first and second threshold values are configured by an Operation, Administration and Maintenance, OAM, node in the communication network.

19. A radio base station according to claim 16, wherein said first and second threshold values are configured by a network provider according to requirements of different scenarios.

20. A radio base station according to claim 16, further comprising a scheduler adapted to allocate a frequency resource to the UE based on the location of the UE.

* * * * *

UNITED STATES PATENT AND TRADEMARK OFFICE
CERTIFICATE OF CORRECTION

PATENT NO. : 9,301,304 B2
APPLICATION NO. : 14/352300
DATED : March 29, 2016
INVENTOR(S) : Liu et al.

It is certified that error appears in the above-identified patent and that said Letters Patent is hereby corrected as shown below:

On the title page

Item (74), delete "Myers Bigel & Sibley, P.A." and insert -- Myers Bigel Sibley & Sajovec, P.A. --, therefor.

On Page 2, item (56), Column 2, Line 6, delete "Ep" and insert -- EP --, therefor.

In the specification

Column 5, Line 52, delete "RSRP" and insert -- $RSRP_i$ --, therefor.

Signed and Sealed this
Twenty-eighth Day of June, 2016

Michelle K. Lee
*Director of the United States Patent and Trademark Office*